United States Patent [19]
Shechet

[11] Patent Number: 5,568,537
[45] Date of Patent: Oct. 22, 1996

[54] TRANSPORTABLE MOBILE CELLULAR SYSTEM

[76] Inventor: Mark J. Shechet, P.O. Box 2146, Sioux City, Iowa 51104-0146

[21] Appl. No.: 294,898

[22] Filed: Aug. 23, 1994

Related U.S. Application Data

[63] Continuation of Ser. No. 31,486, Mar. 15, 1993, abandoned.

[51] Int. Cl.⁶ ..................................................... H04Q 7/32
[52] U.S. Cl. .............................................. 379/58; 455/90
[58] Field of Search ......................... 379/58, 59; 455/89, 455/90, 11.1, 128, 351, 127, 343

[56] References Cited

U.S. PATENT DOCUMENTS

| | | | |
|---|---|---|---|
| 4,677,654 | 6/1987 | Lagin | 379/58 |
| 4,881,258 | 11/1989 | Kaiwa et al. | 455/90 |
| 4,962,523 | 10/1990 | Tanaka | 379/58 |
| 5,109,541 | 4/1992 | Park | 455/89 |
| 5,170,494 | 12/1992 | Levanto | 379/58 |
| 5,175,759 | 12/1992 | Metroka et al. | 379/58 |

FOREIGN PATENT DOCUMENTS

| | | |
|---|---|---|
| 0452011 | 10/1991 | European Pat. Off. . |
| 0117119 | 6/1991 | Japan . |

OTHER PUBLICATIONS

Advertisement: Magnum–Roamx, *Washington Times*, Nov. 26, 1986, p. 5E.
Radio Shack 1990 Catalog No. 446 p. 10.
Radio Shack Sale Flyer Sale Ending Jul. 27, 1991 p. 11.

*Primary Examiner*—Curtis Kuntz
*Assistant Examiner*—Michael B. Chernoff
*Attorney, Agent, or Firm*—Richard C. Litman

[57] ABSTRACT

A modified mobile cellular booster system is used to boost the power of a hand held portable cellular phone, from a maximum of six-tenths of a watt (0.6 watts), to the maximum power level of a mobile cellular phone, three (3) watts. The main components of the system come from a conventional mobile cellular booster system presently sold on the market. A completely portable, self-contained, modified mobile cellular booster system, including a power supply and antenna, is provided as a transportable unit, carried in a tote bag or case, and does not require permanent installation.

14 Claims, 2 Drawing Sheets

TRANSPORTABLE MOBILE CELLULAR SYSTEM

CROSS-REFERENCE TO RELATED APPLICATION

This is a continuation of Ser. No. 08/031,486, filed Mar. 15, 1993, now abandoned.

BACKGROUND OF THE INVENTION

1. Field of the Invention

The present invention relates to a portable cellular phone system which may be used as a stand alone unit or may be used in a vehicle. More particularly, the present invention relates to those portable cellular phone systems encased in a portable bag, which includes an internal power source, a transceiver/booster, and an antenna; or which may use the car battery for power and an external antenna for enhanced reception when used inside a vehicle.

2. Description of the Prior Art

Within the cellular phone industry, handheld cellular phones, hereafter referred to as portables, have a maximum output of six-tenths of a watt (0.6 watts). Mobile cellular car phones, hereafter referred to as mobile units, have maximum outputs of three (3) watts. There are also transportable cellular phones, hereafter referred to as transportables, which are carried in a case or a bag. These transportables have the same maximum output power rating as mobile phones. In fact, a transportable cellular phone is just a mobile unit installed in a bag or a hard case which can utilize an internal battery for power and antenna or can use vehicular power and external antenna.

Some manufactures have already designed three (3) watt booster systems to boost the output power of portables to the same full legal output power limit as a mobile phone. This type of system allows a user the convenience of utilizing a lightweight portable unit while on foot, while taking advantage of a vehicle's three (3) watt booster when used in a vehicle in which a three (3) watt booster system is installed.

U.S. Pat. No. 4,677,654 issued Jun. 30, 1987 to Steven R. Lagin discloses a portable cellular phone within a carrying case which may be used inside an automobile.

U.S. Pat. No. 4,962,523 issued Oct. 9, 1990 to Mituru Tanaka discloses a portable cellular phone unit with a built-in battery to supply power to the unit until a larger voltage is detected from an external power connection, in which case an automatic switch enables the unit to be powered through the use of the external power connection. The unit may thus be used as a stand-alone unit or within a vehicle.

U.S. Pat. No. 5,170,494 issued Dec. 8, 1992 to Lauri Levanto discloses a basic telephone unit which may be hooked up to a high powered amplification and transceiver or a low power amplification and transceiver system.

Japanese Patent No. 0117119 issued May 17, 1991 to Kono Mitsunori and European Patent Application No. 0452011 published Oct. 16, 1991 with Jarmo Heinonen listed as the sole inventor both disclose portable telephone sets which may be hooked up to a booster unit for amplifying the transmission signal.

None of the above inventions and patents, taken either singly or in combination, is seen to describe the instant invention as claimed.

SUMMARY OF THE INVENTION

In the prior art, if a portable was to be moved from vehicle to vehicle, with the intent to take full advantage of a three (3) watt booster system, then such a booster system would have to have been installed in each separate vehicle. However, in the present invention, a mobile cellular booster system is incorporated into a transportable tote bag with its own power supply and antenna hook up. If utilized within a vehicle, the present invention can be connected to the vehicle's cellular antenna and car battery, if desired.

The principles of the invention may be applied to virtually any data transmission (that is, voice or other signal) system, wherein a low power data transmission unit is used with a booster, normally found as a permanent installation in a vehicle or in a fixed location.

It is an object of the invention to provide a mobile three (3) watt booster unit or system within a tote bag.

It is another object of the invention to provide a transportable battery pack and transportable antenna within a tote bag for operating the mobile booster unit therein as a stand alone unit.

It is a further object of the present invention to provide connections between the transportable antenna and transportable battery which may be disconnected and then reconnected to a standard vehicle cellular antenna and the vehicle power source, e.g., a cigarette lighter receptacle.

Still another object of the present invention is to eliminate the need of installing a mobile three watt booster unit within each vehicle in which a portable is to be used.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
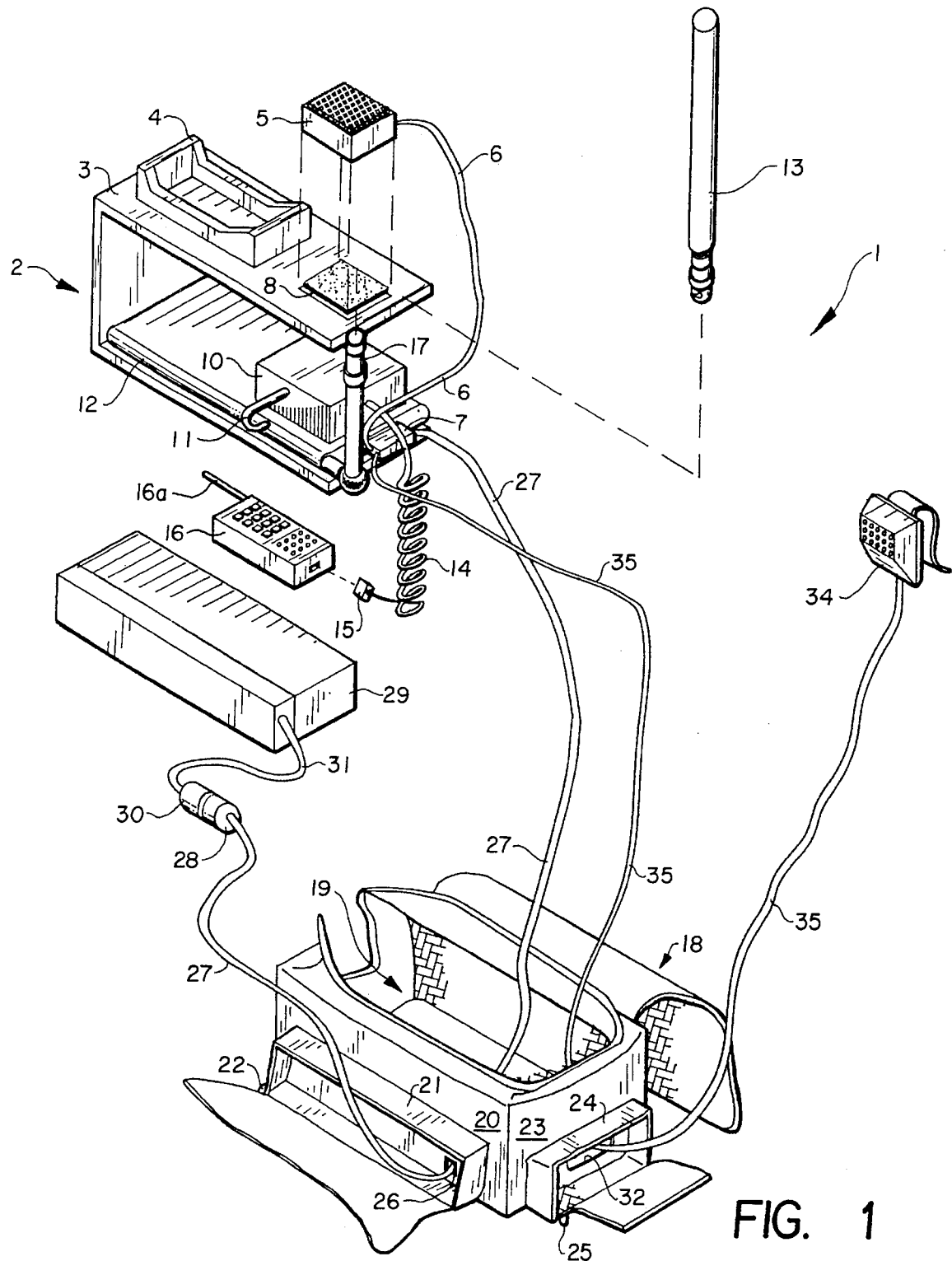
FIG. 1 is an exploded perspective view of the present invention.

The present invention pertains to a three (3) watt vehicle booster kit, such as a 3-Watt VA sold by Motorola, which is modified to fit into a tote bag so as to form a transportable cellular phone system capable of boosting the power from six-tenths of a watt (0.6 watts) to three (3) watts. As shown in FIG. 1, the modified mobile cellular booster system 1 of the present invention comprises the main transportable cellular phone unit 2 insertable into an interior portion 19 of a tote bag 18 to boost the output power of a conventional portable handset cellular phone 16 from a maximum of six-tenths of a watt (0.6 watts) to a maximum of three (3) watts, the full legal output power limit of mobile or transportable cellular phones.

The main components of unit 2 include a portable cellular phone cradle 4 attached to the top of a connector brace 3 in any conventional manner, e.g., by threaded fasteners. The cradle 4 is configured to house the portable cellular phone 16 and includes recharger circuitry which does not form a part of the present invention per se. The recharger circuitry is used to recharge the portable battery (not illustrated), if desired, via cradle 4, from power supplied by a vehicle's battery (not illustrated). The main components of unit 2 also include a speaker 5, used during a hands-free operation of the modified mobile cellular booster system 1, and accomplished when the portable 16 is placed within the cradle 4. The speaker 5 is attached to the brace 3 by suitable means, such as hook and loop fastening tape 8. The speaker has a speaker wire 6 attached to the bus connection 7 which in turn is attached to the transceiver/booster 12. The transceiver/booster 12 is attached to the brace 3 in any conventional manner.

The unit 2 also includes a handset interface unit 10 connected by an electrical bus 11 to a transceiver/booster 12. The bus connection 7 connects directly to the transceiver/booster 12, and the interface coil cord 14 having a plug 15 attached thereto connects to the portable 16. In this manner the portable 16 is connected to the modified mobile cellular booster system 1. When the portable 16 is plugged into the system 1, the portable 16 does not use the antenna 16a, but rather an antenna 13 connected to the transceiver/booster 12. A standard mobile cellular antenna connection jack 17 is connected to the transceiver/booster 12 to allow a portable cellular phone antenna 13 to be attached thereto since the antenna connection jack 17 is standard for mobile cellular phones as well as transportable antennas. In this manner the portable cellular phone antenna 13 or a vehicle's mobile cellular antenna (not illustrated) may be connected to the transceiver/booster 12. The antenna 13 is preferably a rubber duck antenna which may be folded down or removed when not in use.

The main transportable cellular phone unit 2 is configured to fit snugly into the inner compartment 19 of the tote bag 18. The inner compartment 19 has a predetermined depth substantially the same as the height of the main transportable cellular phone unit 2, a predetermined length substantially equivalent to the length of the main transportable cellular phone unit 2, and a predetermined width substantially the same as the width of the main transportable cellular phone unit 2.

In this manner the main transportable cellular phone unit 2 fits snugly into the inner compartment 19 when the antenna 13 is folded down or removed from the jack 17 even with the portable 16 being located within the cradle 4. The tote bag includes a first outside wall 20 having a first pocket 21 extending out therefrom. The first pocket 21 has an opening 28 extending through the first outside wall 20 into the inner compartment 19 from within the first pocket 21. In this manner a first electrical cord 27 connects at one end to the transceiver/booster 12 via the bus connection 7. The other end of the first electrical cord 27 connects to a conventional cigarette lighter plug 28 as used in vehicles.

The modified mobile cellular booster system 1 of the present invention includes a rechargeable transportable battery 29 with a conventional cigarette lighter socket 30 attached at the end thereof via a battery power cord 31. In this manner, the modified mobile cellular booster system 1 is powered when the conventional cigarette lighter plug 28 is plugged into the conventional cigarette lighter socket 30 of the transportable battery 29.

When the modified mobile cellular booster system 1 is used as a transportable unit, the rechargeable transportable battery 29 is used to power the system 1. Once the cigarette lighter plug 28 is connected to the cigarette lighter socket 30, the battery 29 is placed inside the first pocket 21 with the first electrical cord 27 and the battery power cord 31 inserted into the first pocket 21 along with the rechargeable transportable battery 29. The first pocket 21 may be opened and closed via a conventional zipper 22.

The modified mobile cellular booster system 1 also includes a hands-free microphone 34 insertable into a second pocket 24 extending out from a second outside wall 23. The microphone may be placed within the pocket 24, along with a second electrical cord 35 when not in use. The second electrical cord 35 connects the hands-free microphone 34 to the transceiver/booster 12 via the bus connection 7. A second opening 32 allows the second electrical cord 35 to pass from the second pocket 24 to the inner compartment 19 where it is attached to bus 7. When not in use, the hands-free microphone 34 and its associated second electrical cord 35 are stored within the second pocket 24, with the second pocket 24 securely shut via a conventional zipper 25.

Figure 2:
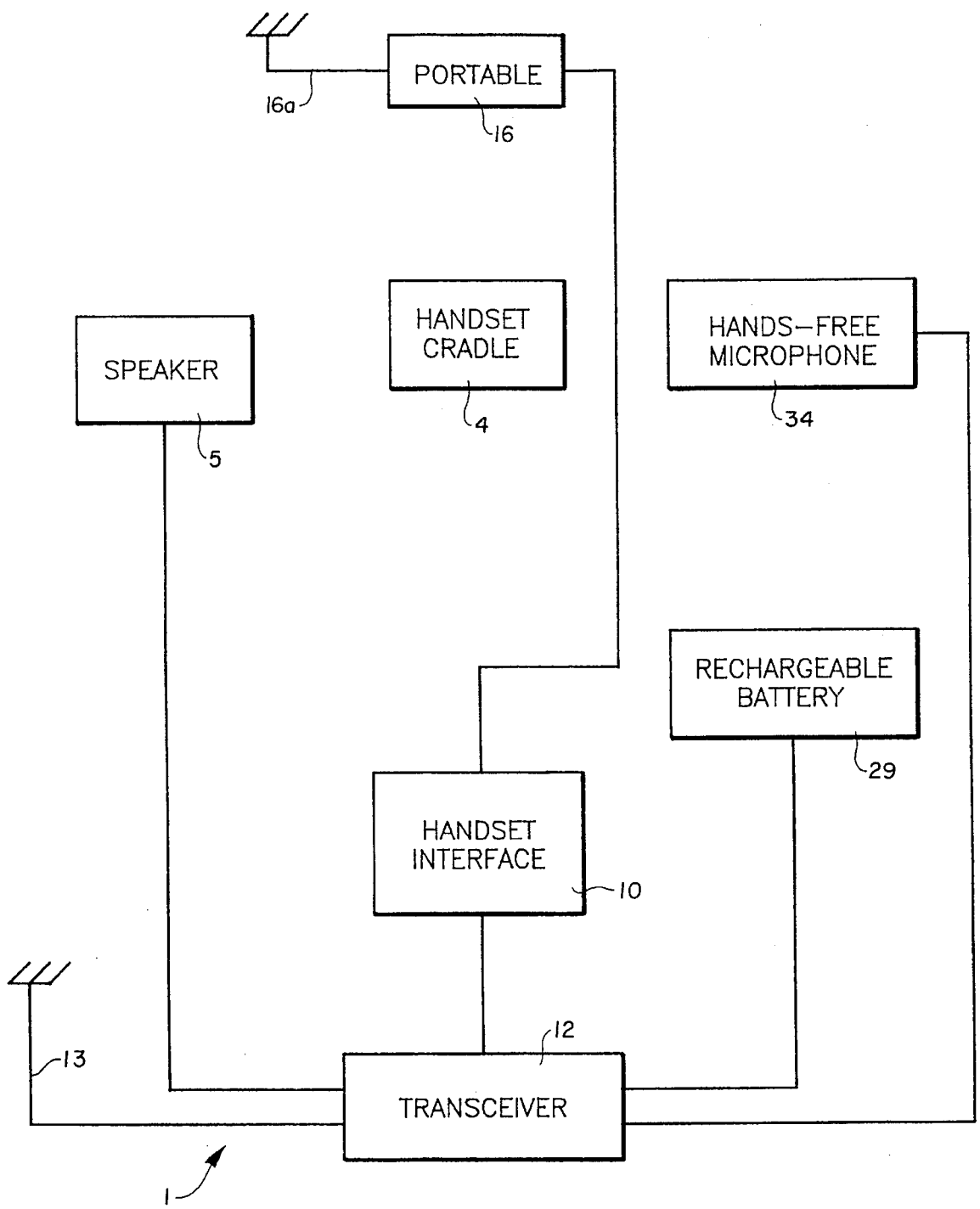
FIG. 2 is a schematic diagram of the present invention.

The operation of the modified mobile cellular booster system will now be discussed in conjunction with FIG. 2. Once the portable cellular phone 16 is connected to handset interface 10 via the coil cord 14 and plug 15, all electrical signals from the portable cellular phone 16 pass through the handset interface 10 to the transceiver/booster 12. The handset interface 10 processes the electrical signals from the portable 16 before providing the processed signals to the input of the transceiver/booster 12. The transceiver/booster 12 transmits this signal to the antenna 13, as is conventional in the art. Further the antenna 13 is used to receive a cellular phone transmission to allow the transceiver/booster 12 to demodulate the received signal and supply the same to the handset interface and to the portable 16. Note that the handset interface 10 and transceiver/booster 12 are standard components, for example, sold by Motorola as discussed above.

During the hands-free mode of operation of the modified mobile cellular booster system 1, the hands-free microphone 34 is placed near the user, for example, on the visor of a vehicle. Any signal received by the transceiver/booster 12 is sent to the speaker 5 after being demodulated, instead of the handset interface 10. Also, the signal to be transmitted by the transceiver/booster 12 is received from the hands-free microphone 34 instead of the microphone of the portable 16. As shown in FIG. 2, the power supply may come from the rechargeable transportable battery 29; otherwise, the vehicle's battery is used to supply the power to the system 1, when available, in order to conserve the energy of the battery 29.

A number of variations of a transportable three watt booster system are possible. For example, if the transceiver/booster is omitted from the kit just outlined above, a transportable handsfree system is left. The remaining components described are still present, but no power boost is provided. Now, a handsfree kit, original designed for installation in a vehicle, is now installed in a tote bag, making the handsfree unit completely transportable.

On the other hand, various components may be added to the above described, transportable 3 watt booster system to enhance its operation yet retain the completely portable characteristic. A standard handset may be added along with an enhanced transceiver booster to give a transportable three watt booster system the capability of multiple phone numbers, and all the inherent features of a mobile or transportable, in a completely portable environment.

Additionally, other interfaces can be subsequently attached to the kit, to allow computers, facsimile transmission machines, credit card verification machines and similar telecommunications products to be used in conjunction with the transportable three watt booster system.

Further broadening the scope of this invention, the principles of portability/transportability herein may be applied in systems other than only a three watt booster system, For example, two-way radios, which may include vehicle installed, 50 watt boosters, are known. Applying the principles of the instant invention, it is readily possible to configure a kit including two-way radio, 50 watt booster, battery and antenna into a tote bag or the like, thus making the system completely self-contained and portable. Further along this line of development, the principles of the instant invention may be applied to the developing PCS (personal communications services) industry, this being the latest communications technology. The low power communication unit, booster, battery, antenna and suitable connections/interfaces may be installed in a tote bag or the like, thus to provide a completely self contained and portable PCS system.

It is to be understood that the present invention is not limited to the embodiments described above, but encompasses any and all embodiments within the scope of the following claims.

I claim:

1. In combination, a fully self-contained, portable cellular phone and a mobile cellular booster system modified for use as a transferable cellular phone booster unit capable of boosting the output power of said portable phone unit, comprising:

connecting means for attaching a set of main components of said modified mobile cellular booster system to one another to form a main transferable cellular phone booster unit capable of boosting the output power of said portable cellular phone attachable thereto, said main transferable cellular phone booster unit having a predetermined height, a predetermined width, and a predetermined length, said main components including a portable cellular phone cradle for housing said portable cellular phone a speaker, a power transceiver/booster, a speaker wire connected to said speaker and said power transceiver/booster for allowing hands-free operation of said speaker when said modified mobile cellular booster system is operated in a hands-free mode, a transportable cellular antenna, a phone cord attached at one end to said power transceiver/booster and at another end to a plug for connecting to said portable cellular phone, and a mobile cellular antenna connection jack connected to said transceiver/booster for selectively attaching and disconnecting an antenna cable attached to a vehicle cellular antenna and said transportable cellular antenna;

a tote bag having an interior compartment with a predetermined depth of substantially the same distance as said predetermined height of said main transferable cellular phone booster unit, a predetermined length substantially equivalent to said predetermined length of said main transferable cellular phone booster unit, and a predetermined width substantially the same as said predetermined width of said main transferable cellular phone booster unit, said main transferable cellular phone booster unit being placed inside the interior compartment of said tote bag;

a first outside wall of said tote bag having a first pocket extending outwardly therefrom, including first securing means for selectively opening and closing said first pocket;

a second outside wall of said tote bag having a second pocket extending outwardly therefrom, including second securing means for selectively opening and closing said second pocket;

a first opening extending through said first outside wall enabling a first electrical cord to pass therethrough to connect to said power transceiver/booster at a first end of said first electrical cord and to a cigarette lighter plug at a second end of said first electrical cord;

a transportable battery having a cigarette lighter socket attached thereto;

a second opening extending through said second outside wall having a second electrical cord passing therethrough so as to connect to said power booster at a first end of said second electrical cord and to a microphone at a second end of said second electrical cord for enabling hands-free operation of said microphone when said modified mobile cellular booster system is operated in a hands-free mode;

wherein power is supplied to said modified mobile cellular booster system when said cigarette lighter plug is connected to said cigarette lighter socket of said transportable battery and when said cigarette lighter plug is connected to a cigarette lighter socket of a vehicle, said fully self-contained, portable cellular phone being operable independently from said booster unit when said portable cellular phone is removed from said portable cellular phone cradle.

2. A fully self-contained, portable cellular phone and a modified mobile cellular booster system as claimed in claim 1, wherein said transportable cellular antenna comprises a short length, flexible antenna.

3. A fully self-contained, portable cellular phone and a modified mobile cellular booster system as claimed in claim 1, wherein said first and second securing means include zippers.

4. A fully self-contained, portable cellular phone and a modified mobile cellular booster system as claimed in claim 1, wherein said portable cellular phone cradle includes means for recharging said portable cellular phone placed therein.

5. A fully self-contained, portable cellular phone and a modified mobile cellular booster system as claimed in claim 1, further including a handset interface unit, an electrical bus connecting said portable cellular phone to said transceiver/booster such that said handset interface unit receives said phone cord for processing an input signal provided by said portable cellular phone attached to said phone cord so as to be transmitted by said transceiver/booster at a boosted output power level, while also processing an input signal provided by said power transceiver/booster received thereby to be sent to said portable cellular phone.

6. A fully self-contained, portable cellular phone and a modified mobile cellular booster system as claimed in claim 5, wherein said boosted power output level is a maximum of three watts.

7. A fully self-contained, portable cellular phone and a modified mobile cellular booster system as claimed in claim 1, wherein said transportable battery is a rechargeable transportable battery.

8. A fully self-contained, portable cellular phone and a modified mobile cellular booster system as claimed in claim 1, wherein said speaker is detachably connected to said connecting means using hook and loop fastening means.

9. A fully self-contained, portable cellular phone and a modified mobile cellular booster system as claimed in claim 1, wherein, said transceiver/booster has an output power of a maximum of three watts.

10. A method of constructing a modified mobile cellular booster system and portable phone combination, the mobile cellular booster system being modified for use as a transferable cellular phone booster unit from mobile cellular phone components comprising the steps of:

combining main components of a modified mobile cellular booster system to form an integrally connected main transferable cellular phone booster unit capable of boosting the output power of a fully-self-contained portable cellular phone, the main components including a portable cellular phone cradle, a speaker, a power transceiver/booster, a phone cord attached at one end to the power transceiver/booster and at another end to a phone plug for connecting a portable cellular phone, a transportable cellular antenna, and a mobile cellular antenna connection jack connected to the transceiver/booster for attaching one of the transportable cellular antenna and a cellular antenna of a vehicle to the power transceiver/booster;

placing the main transferable cellular phone booster unit within the inner compartment of a tote bag;

providing a first opening in a first pocket of the tote bag for allowing an electrical cord connected to the main transferable cellular phone booster unit located within the compartment to exit into the first pocket;

placing a cigarette lighter plug at the end of the electrical cord exiting into the first pocket;

placing a cigarette lighter socket at the end of a transportable rechargeable battery for allowing a portable operation of the modified mobile cellular booster system when the cigarette lighter plug is connected to the cigarette lighter socket and the transportable rechargeable battery is placed within the first pocket; and placing a second opening in a second pocket of the tote bag for allowing a hands-free microphone to be placed from the inner compartment into the second pocket through the second opening.

11. A completely portable, self contained, transportable, data transmission system comprising:

a fully self-contained, low power, portable, data transmission unit;

booster means for boosting the power of said low power unit to the maximum wattage predetermined for said low power unit;

battery means for providing a source of power for both said low power unit and said booster means;

an antenna; and tote bag means for containing said low power unit, said booster means, said battery means and said antenna; whereby said data transmission system may be operated as a completely self-contained unit, unconnected to any external source of electrical power, and said fully self-contained low power, portable, data transmission unit may be operated selectively apart from and connected to said booster means.

12. In combination, a fully self-contained, portable cellular phone and a mobile cellular booster system modified for use as a transferable cellular phone booster unit capable of boosting the output power of said portable phone unit, comprising:

a fully self-contained, fully self-powered, low power, portable cellular phone;

booster means for boosting the power of said low power phone to the maximum wattage predetermined for said low power unit;

battery means for providing a source of power for both said low power, portable cellular phone and said booster means; and an antenna; whereby, said low power, portable cellular phone may be operated as a completely self-contained unit, unconnected to any external source of electrical power, and said fully self-contained low power, portable cellular phone may be operated selectively apart from and connected to said booster means.

13. A fully self-contained, portable cellular phone and a modified mobile cellular booster system as claimed in claim 12, wherein said boosted power output level is a maximum of three watts.

14. A fully self-contained, portable cellular phone and a modified mobile cellular booster system as claimed in claim 12, further comprising tote bag means for containing said low power, portable cellular phone, said booster means, said battery means and said antenna.

* * * * *